I. M. Singer,
Carving Wood,
No 13,921.
Patented Dec. 11, 1855.
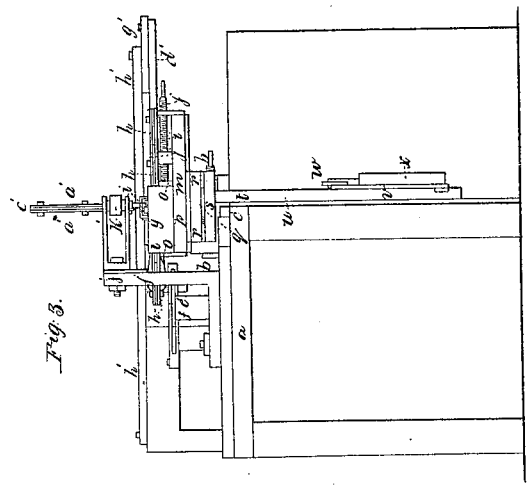
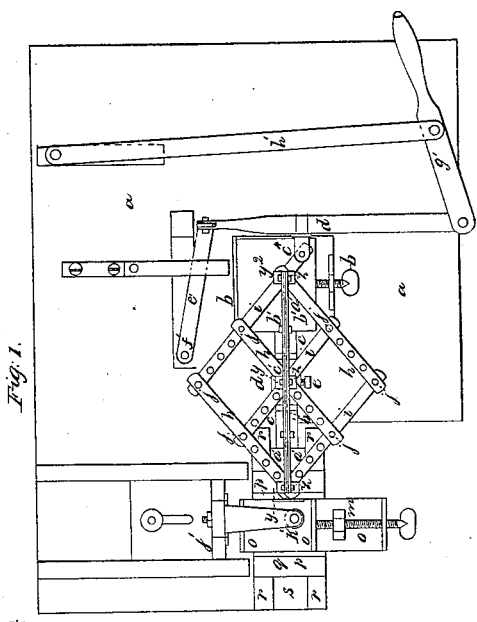
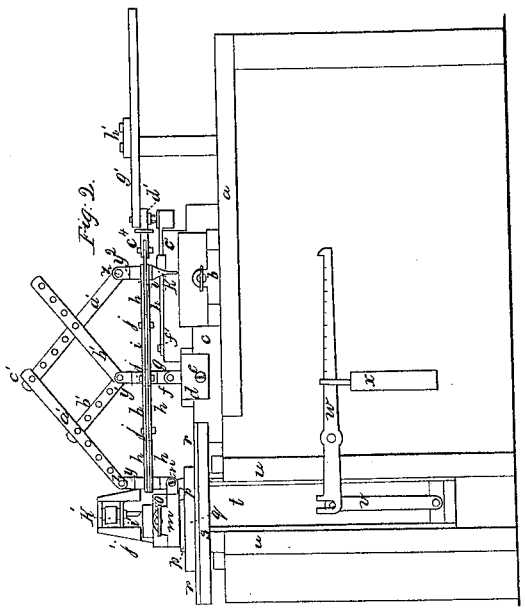
Witnesses:
Wm H Bishop
Andrew De Lacy
Inventor:
Isaac M. Singer

UNITED STATES PATENT OFFICE.

I. M. SINGER, OF NEW YORK, N. Y.

MACHINE FOR CARVING WOOD, &c.

Specification of Letters Patent No. 13,921, dated December 11, 1855.

*To all whom it may concern:*

Be it known that I, ISAAC M. SINGER, of the city, county, and State of New York, have invented certain new and useful Improvements in a Machine for Carving Wood and other Solid Substances, of which the following is a full, clear, and exact description, reference being had to the accompanying drawings, making part of this specification, in which—

Figure 1, is a plan or top view. Fig. 2, a front, and Fig. 3, an end elevation.

The same letters indicate like parts in all the figures.

In the machine for which Letters Patent were granted to me bearing date the 10th day of April 1849, the tracer which passes over the irregularities of the pattern is connected with a system of pentograph levers, by which corresponding motions are imparted to a table connected with the opposite end of the said pentograph levers on which table the block to be carved is secured, and this block is thus made to move under a rotating cutter to cut away the surplus material, the said cutter having an independent motion to determine the depth of cut; but this independent motion of the cutter is not governed by the tracer or pentograph levers, and therefore the said machine could only trace the lines of the figure to be cut on a plane, and could not determine the vertical irregularities.

The object of my present invention is to enable the tracer to determine the position of the block relatively to the cutter so that the depth and elevation of the configuration shall be determined as well as the lateral configuration. And to this end my invention consists in combining the tracer and the table which carries the block to be carved by means of two systems of pentograph levers operating at right angles with each other, one to transfer to the table the lateral and longitudinal movements of the tracer, and the other the vertical movements whereby the block will be so presented to the action of the cutter as to produce thereon an exact duplicate of the pattern whether of the same or an increased or diminished size.

In the accompanying drawings *a* represents a suitable bench provided with clamps and screws *b*, *b*, for securing the pattern to be copied of whatever form desired. On a rail *c*, is fitted a block *d*, which can slide thereon for adjustment and be held in place by a clamp screw *e*. To the upper part of this block is jointed a short spindle *f*, turning on a fulcrum pin *g*, and this spindle forms the axis on which the two systems of pentograph levers can turn horizontally while the connection of the spindle with the block *d*, admits of the vibration in a vertical plane. The horizontal pentograph is composed of two sets of levers *h* and *i*, each set consisting of three levers. The three levers constituting each set are parallel and the whole constitutes a parallelogram of equal sides, the levers *h*, *h*, *h*, being made to embrace the other levers *i*, *i*, *i*, and connected by joint pins *j'*. The two center levers cross each other and turn on the spindle *f*. The two sets of levers are pierced with numerous holes at equal distances apart so that by shifting one lever of each set and the joint pins the proportions on either side of the spindle can be varied in length. At that angle of the pentograph which is over the pattern the two levers are connected by a joint which is extended down below to form the tracer *k*, to trace over the pattern, and at the opposite angle the two levers are jointed by a spindle *l*, the lower end of which is jointed to one side of a table *m*, by a joint pin *n*. This table is provided with suitable clamps and screws *o*, for clamping the block to be carved, and this table is fitted to slide in ways *p*, *p*, on the top of a carriage *q*, which is in turn fitted to slide in ways *r*, *r*, on a bed or table *s*, at right angles to the ways *p*, *p*, so that the table *m*, with its block can be moved horizontally in any direction. The bed or table *s* is secured to the top of a standard *t*, adapted to slide vertically in ways *u*, *u*, and the whole is suspended by a joint link *v*, to one end of a lever *w*, provided at the other end with an adjustable counterpoise *x*, which can be regulated to balance the weight of this whole fixture so that the table with the block to be carved can be moved up and down freely by the pentograph to which it is jointed.

On the central spindle *f*, on the spindle *l* at one angle, and on the upper end of the tracer *k* at the opposite angle, are secured three short standards *y*, *y'*, *y²*, one at each of these points so placed and connected that they will stand perpendicular to the plane of the levers *h*, and *i*; and to the upper ends of these standards are jointed by suitable joint pins *z*, *z*, *z*, the system of vertical pentograph levers *a'*, *a'*, and *b'*, *b'*.

The lower ends of the two levers $a'$, $a'$, are jointed to the standards $y$, and $y^2$, and their upper ends are jointed together at $c'$, and the two other levers $b'$, $b'$, are both jointed at their lower ends to the standard $y'$, and their upper ends each to one of the levers $a'$. These levers like the levers composing the horizontal system are pierced with numerous holes for shifting the joint pins to vary the proportions.

One of the levers $i$, is of greater length than the others to project beyond its point of connection with the system; at its extremity it is jointed at $c^4$, to a lever $d'$, one end of which is connected by a universal joint with one end of an arm $e'$, turning on a stud pin at $f'$, and the other end of the said lever $d'$, is in turn jointed with a hand lever $g'$, which is connected by a joint link $h'$, with the bench.

The cutter $i'$, is attached to the lower end of an arbor mounted in a standard or frame $j'$, secured to the bench by a clamp screw or other suitable means so that it can be shifted at pleasure, and the arbor of the cutter has a pulley $k'$, to receive a belt from some suitable motor for rotating the cutter at any suitable speed to suit the kind of material to be carved, the cutter being also suited to cut such material.

The block to be carved being secured to the table $m$, and the pattern on the bench under the tracer, and the counter weight properly adjusted, the operative takes hold of the hand lever and slowly passes the tracer over and in contact with the surface of the pattern following all its sinuosities thus imparting to the block to be carved precisely the reversed motions, so that the cutter, which is in a fixed position and rotating, will cut away the substance of the block leaving a form the exact duplicate of the pattern, instead of the reverse which would be the case if the tracer guided the cutter instead of the block to be carved. In this way it will be seen that the most complicated figures can be copied with the utmost accuracy and expedition, one system of pentograph levers transferring all the horizontal and the other all the vertical motions. By shifting the connection of the levers the proportions can be varied so as to make the carving either larger or smaller than the pattern and preserve throughout all the proportions.

I do not wish to be understood as limiting myself to the special construction or arrangement of parts herein specified as these may be varied without changing the mode of operation of my said invention.

I do not claim as my present invention the combination of the tracer with the table which carries the block of wood to be carved by means of one system of pentograph levers, as this is described in Letters Patent granted to me and bearing date the 10th day of April 1849, but What I do claim as my invention and desire to secure by Letters Patent is—

Combining the tracer with the table which carries the block of wood to be carved by means of two systems of pentograph levers operating at right angles with each other substantially as described, whereby the block to be carved will be directed and presented to the action of the cutter in such manner as to determine the configuration as well in a vertical as in a horizontal direction, as set forth.

ISAAC M. SINGER.

Witnesses:
 WM. H. BISHOP,
 ANDREW DE LACY.